(12) United States Patent
Gendler et al.

(10) Patent No.: US 10,289,188 B2
(45) Date of Patent: May 14, 2019

(54) PROCESSOR HAVING CONCURRENT CORE AND FABRIC EXIT FROM A LOW POWER STATE

(71) Applicant: Intel Corporation, Santa Clara, CA (US)

(72) Inventors: Alexander Gendler, Kiriat Motzkin (IL); Henrietta Bezbroz, Or Aqiva (IL)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 15/188,303

(22) Filed: Jun. 21, 2016

(65) Prior Publication Data

US 2017/0364137 A1    Dec. 21, 2017

(51) Int. Cl.
*G06F 13/24* (2006.01)
*G06F 1/3287* (2019.01)
*G06F 9/4401* (2018.01)

(52) U.S. Cl.
CPC .......... *G06F 1/3287* (2013.01); *G06F 9/4418* (2013.01); *G06F 13/24* (2013.01); *Y02D 10/171* (2018.01)

(58) Field of Classification Search
CPC ........ G06F 1/3287; G06F 1/266; G06F 13/24; G06F 9/4418
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |

(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Jing-Yih Shyu
(74) *Attorney, Agent, or Firm* — Trop, Pruner & Hu, P.C.

(57) ABSTRACT

In one embodiment, a processor includes: a plurality of cores, at least some having an advanced programmable interrupt controller (APIC) identifier associated therewith; a plurality of power management agents associated with the plurality of cores; and a power controller to receive an indication of an interrupt and a first APIC identifier and send a wake signal and the first APIC identifier to the plurality of power management agents to determine which of the plurality of cores is associated with the first APIC identifier. Other embodiments are described and claimed.

14 Claims, 21 Drawing Sheets

(56) References Cited

U.S. PATENT DOCUMENTS

| | | |
|---|---|---|
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 9,112,721 B2 | 8/2015 | Behrens et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0070511 A1* | 3/2009 | Kaushik ............... G06F 9/3885 710/267 |
| 2009/0150695 A1 | 6/2009 | Song et al. |
| 2009/0150696 A1* | 6/2009 | Song ..................... G06F 1/3203 713/323 |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0079290 A1 | 3/2012 | Kumar |
| 2012/0246506 A1 | 9/2012 | Knight |
| 2013/0061064 A1 | 3/2013 | Ananthakrishnan et al. |
| 2013/0067132 A1* | 3/2013 | Guddeti ................ G06F 13/24 710/260 |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0198545 A1* | 8/2013 | Lee ....................... G06F 1/3243 713/323 |
| 2013/0346774 A1 | 12/2013 | Bhandaru et al. |
| 2014/0068290 A1 | 3/2014 | Bhandaru et al. |
| 2014/0173151 A1* | 6/2014 | Guddeti ................ G06F 13/24 710/267 |
| 2014/0195829 A1 | 7/2014 | Bhandaru et al. |
| 2014/0208141 A1 | 7/2014 | Bhandaru et al. |
| 2015/0067666 A1 | 3/2015 | Henry et al. |
| 2015/0089249 A1* | 3/2015 | Hannon ............... G06F 9/5094 713/300 |
| 2016/0224090 A1* | 8/2016 | Gendler ............... G06F 1/3203 |
| 2016/0224098 A1* | 8/2016 | Gendler ............... G06F 9/3802 |
| 2017/0031412 A1* | 2/2017 | Gendler ................ G06F 1/04 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

Intel Corporation, "Intel 64 and IA-32 Architectures Software Developer's Manual," vol. 3B: System Programming Guide, Part 2, Apr. 2016, Chapter 14 Power and Thermal Management (14.1-14. 9.5), 42 pages.

U.S. Appl. No. 14/614,712, filed Feb. 5, 2015, entitled "Method and Apparatus to Provide Telemetry Data in a Processor," by Alexander Gendler, et al.

U.S. Appl. No. 14/609,886, filed Jan. 30, 2015, entitled "Performing Context Save and Restore Operations in a Processor," by Alexander Gendler, et al.U.S. Appl. No. 14/812,056.

U.S. Appl. No. 14/812,056, filed Jul. 29, 2015, entitled "Masking a Power State of a Core of a Processor ," by Alexander Gendler, et al.

International Searching Authority, "Notification of Transmittal of the International Search Report and the Written Opinion of the International Searching Authority," dated Aug. 8, 2017, in International application No. PCT/US2017/032108.

* cited by examiner

1100

US 10,289,188 B2

PROCESSOR HAVING CONCURRENT CORE AND FABRIC EXIT FROM A LOW POWER STATE

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
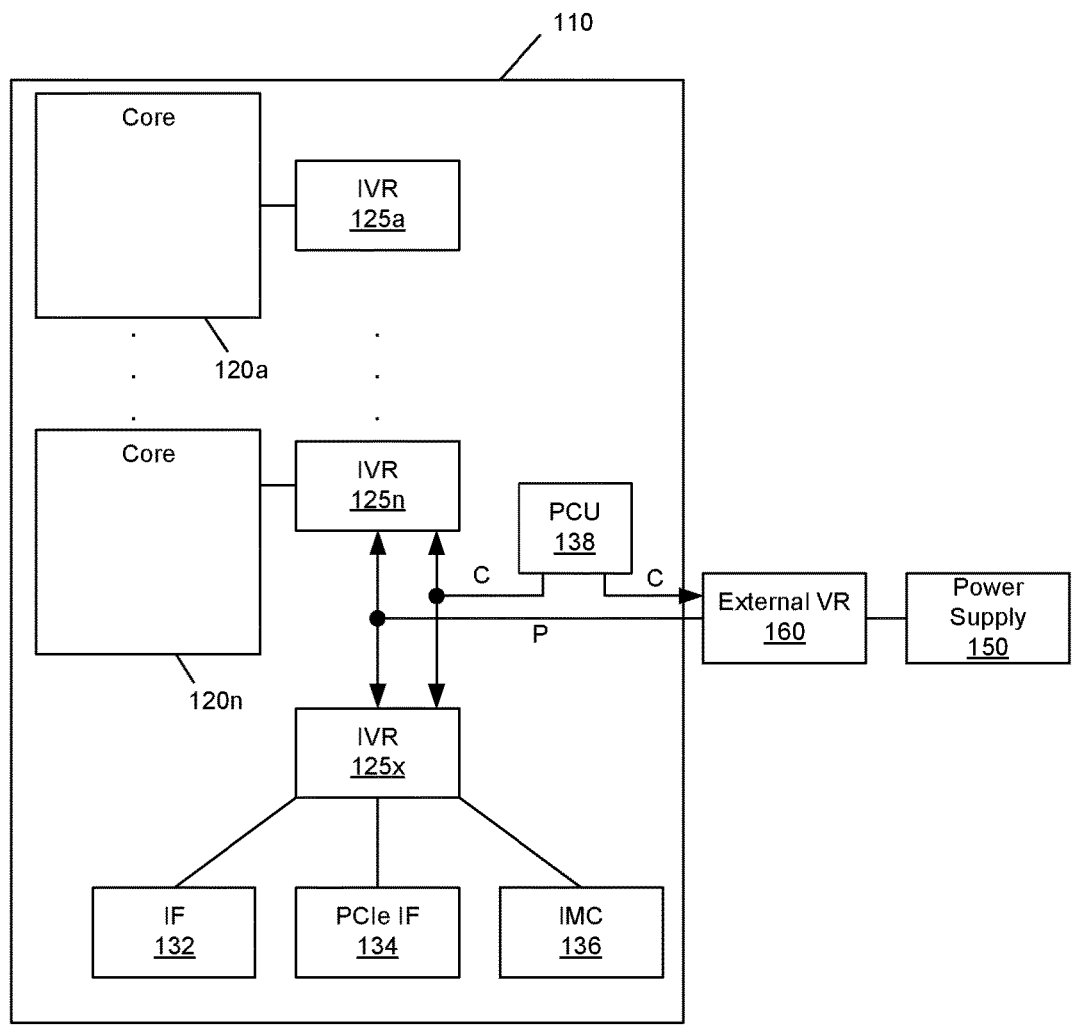
FIG. 1 is a block diagram of a portion of a system in accordance with an embodiment of the present invention.

In various embodiments, a multicore processor is provided with an interrupt mechanism to allow a concurrent waking up of a targeted core and a fabric or other interconnect structure to enable a received interrupt to be provided to the targeted core with reduced latency, where the targeted core and potentially a remainder of the processor are in a given low power state, such as a package low power state, when the interrupt is received.

To this end, embodiments provide techniques to eliminate core low power state exit dependencies that are serialized behind low power state activities of a fabric domain. In this way, embodiments provide for greatly reduced latency when exiting from certain low power states, such as a package deep low power states. As such, embodiments may be used in systems that more readily leverage deep package low power states, as with the reduced exit latency, a processor can be placed into such a package deep low power state and exit in a sufficient amount of time to be able to handle one or more received interrupts within latency tolerances.

As such, embodiments may further provide a greater ability to control decisions as a type of low power state to enter based on such reduced exit latencies. As examples, for a particular package deep low power states, the latency can be reduced, for example, by about 10-15 microseconds. As such, embodiments enable a processor to enter into a deeper low power state, where such deeper low power state may consume only a small portion (e.g., approximately 10%) of the power consumption of another low power state in which a processor would otherwise be placed.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
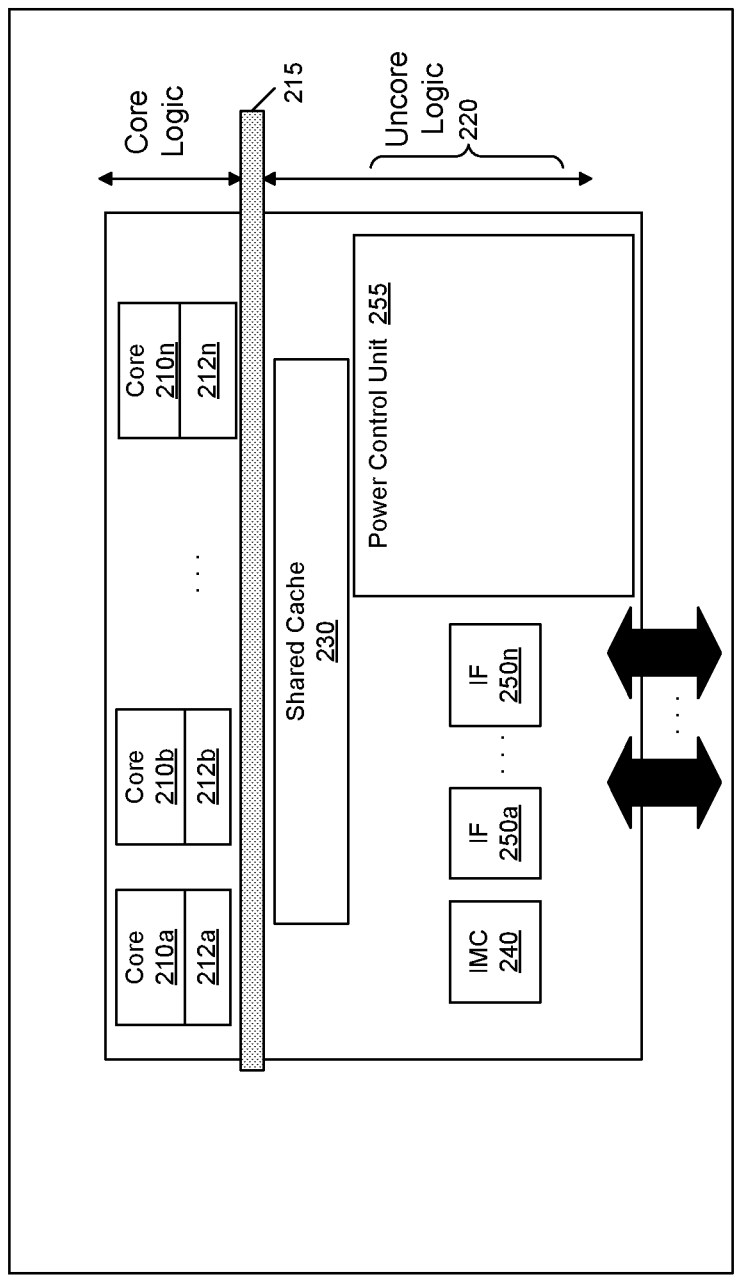
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. Each core 210 may be associated with a corresponding core perimeter logic 212a-212n. In general, core perimeter logic 212 may include one or more independent power/frequency domains that provide an interface between core circuitry and a remainder of the processor. Notably, one or more independent storage units of each core perimeter logic 212 may be adapted to store at least certain context information of the associated core to enable fast entry into and exit from particular low power states and to further enable certain processor operations (such as interrupt handling and snoop responses) to occur while a corresponding core is in a low power state. In addition, such perimeter logic 212 may provide interrupt information while core 210 is in a low power state, to enable faster low power state exits when a given core is targeted by an interrupt.

The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein. In some cases, in addition to direct connections between given cores 210 and uncore 220, core perimeter logics 212 also may be directly coupled to at least portions of uncore 220.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
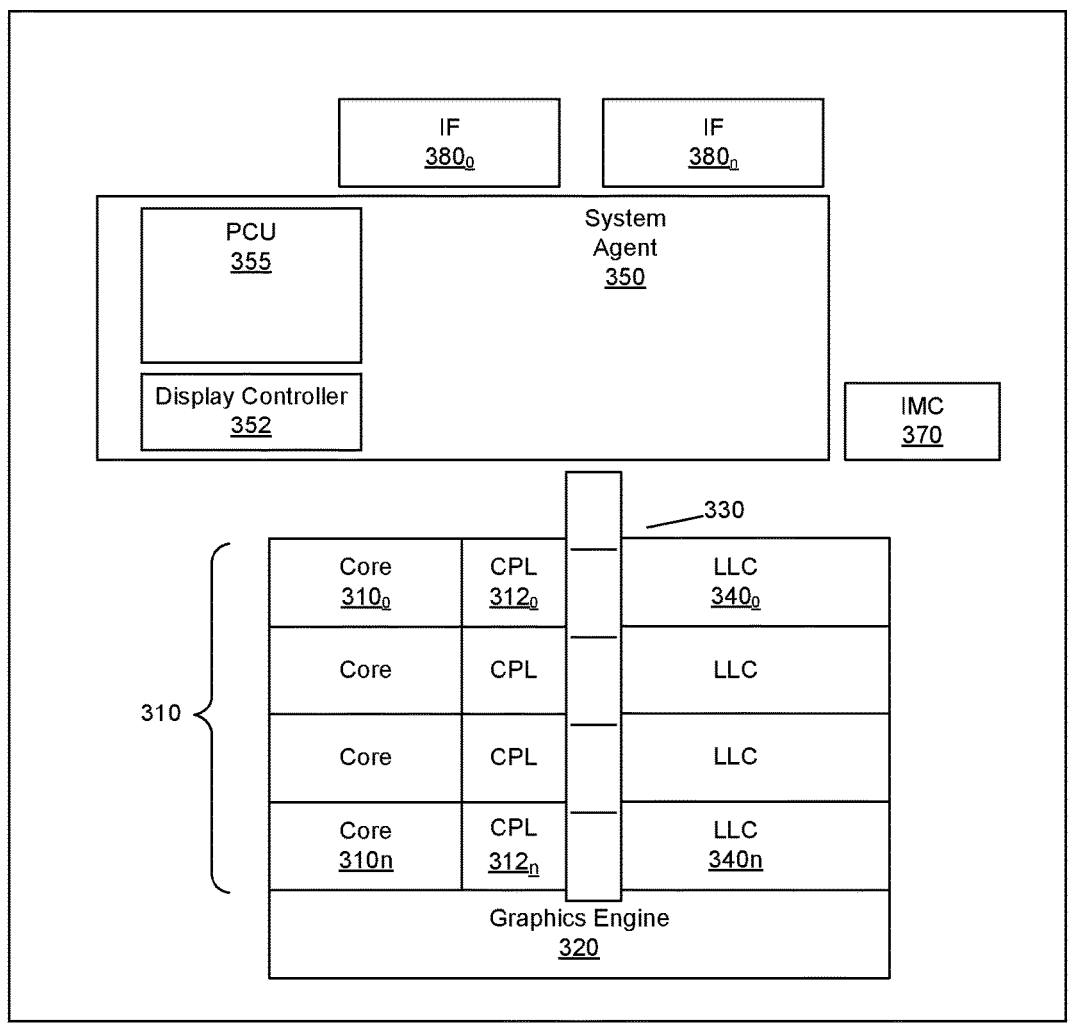
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain. As further shown, a plurality of core perimeter logics $312_0$-$312_n$ each may be associated with a given core and may provide for efficient storage and retrieval of context information, e.g., as used during low power entry and exit situations. In the illustration of FIG. 3, core perimeter logic 312 is shown coupled between a corresponding core 310 and ring interconnect 330, and may further be used to provide information for use in identifying a target core for an interrupt, while the core is in a low power state. However understand that direct connection between core 310 and ring interconnect 330 may be present, along with corresponding direct connection between core perimeter logic 312 and ring interconnect 330, in some embodiments.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
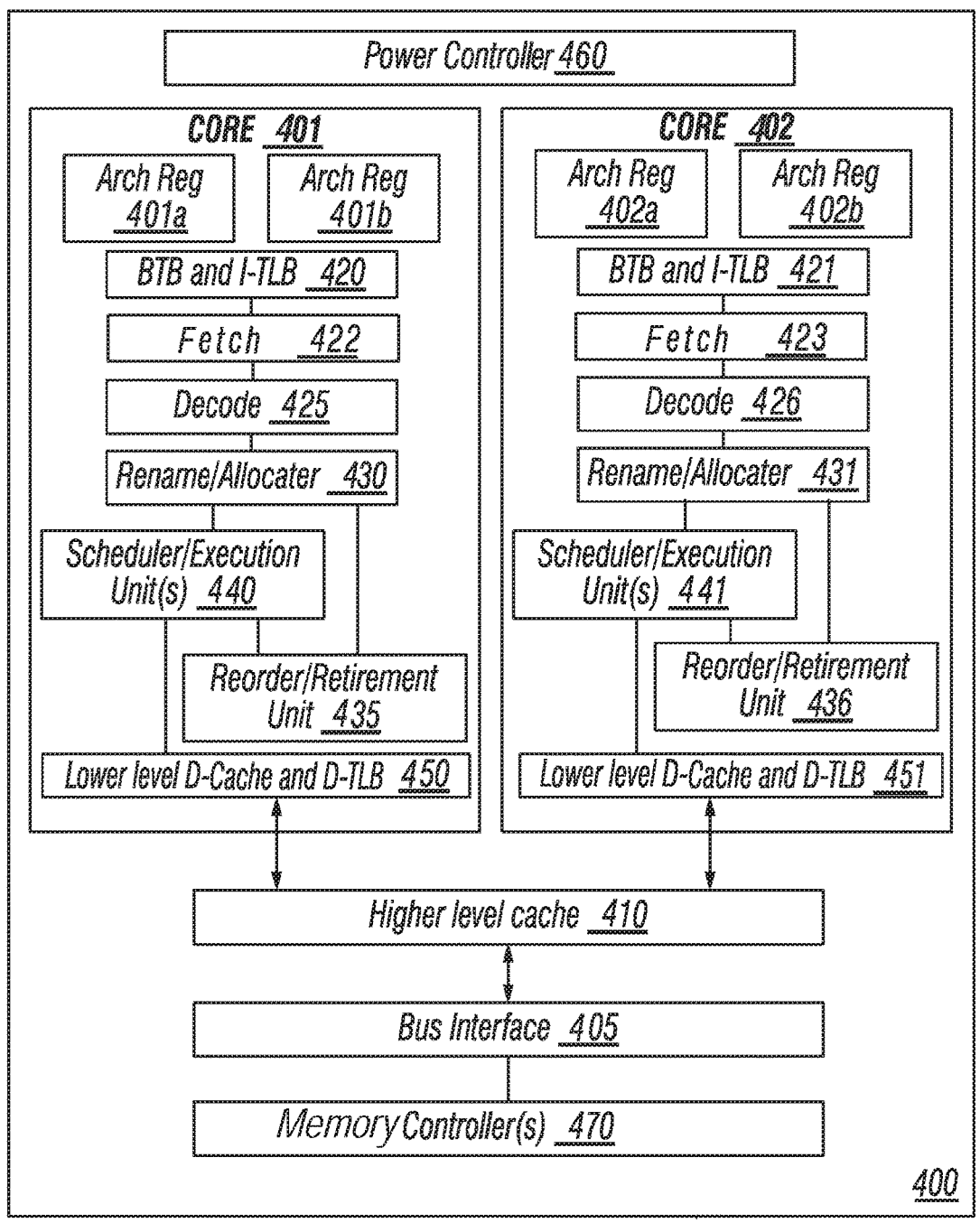
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 450, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 422 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
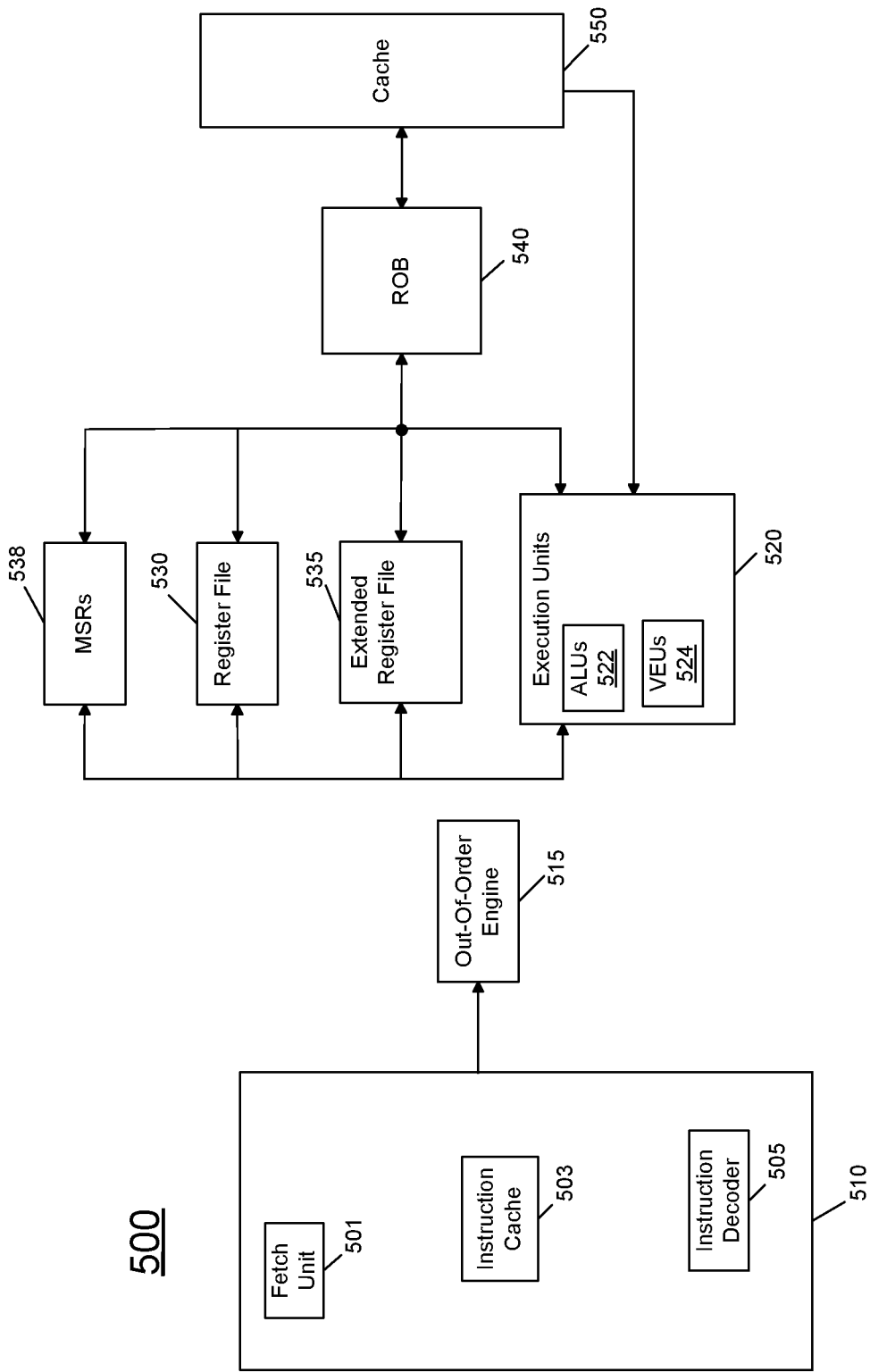
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
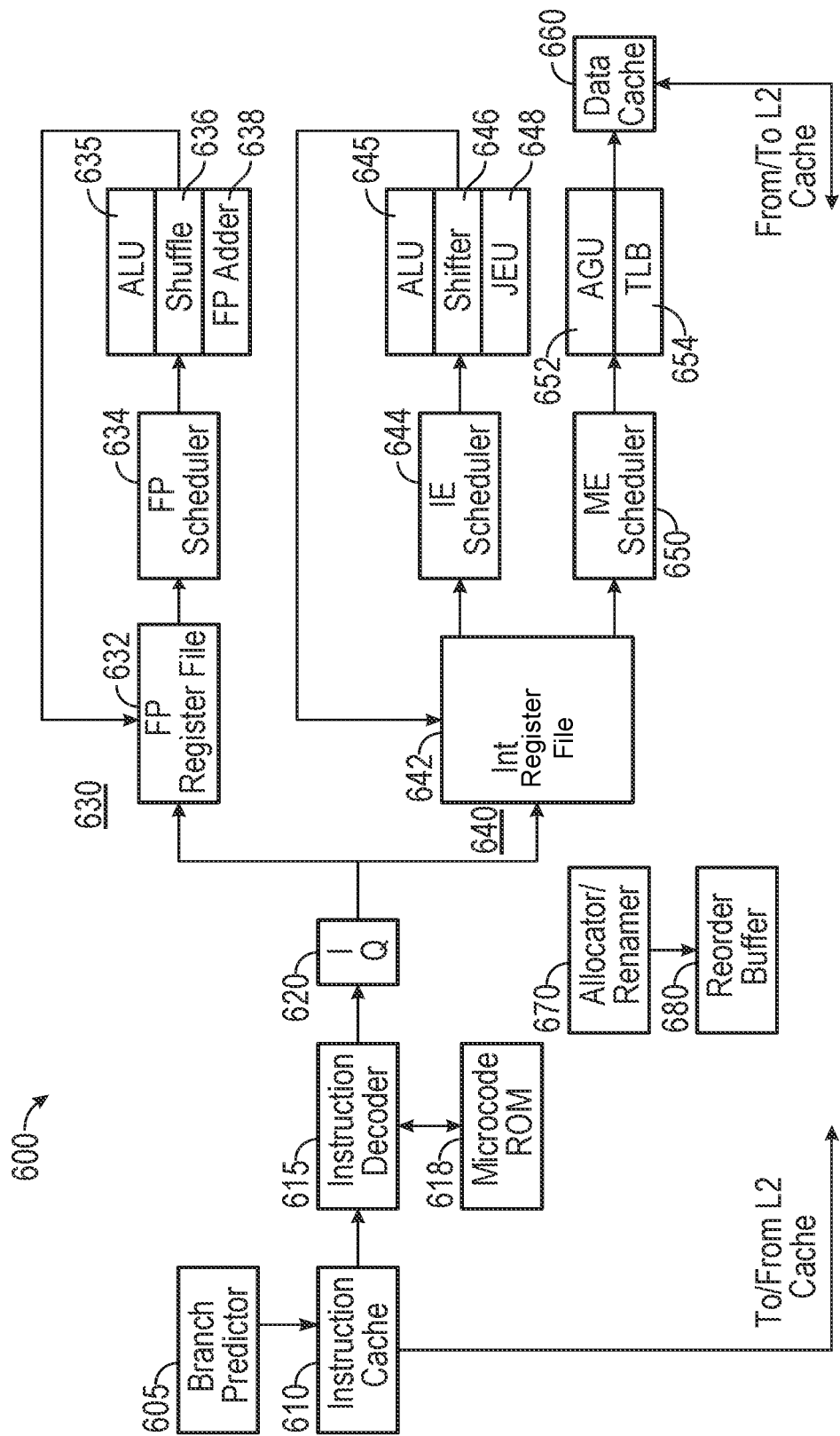
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
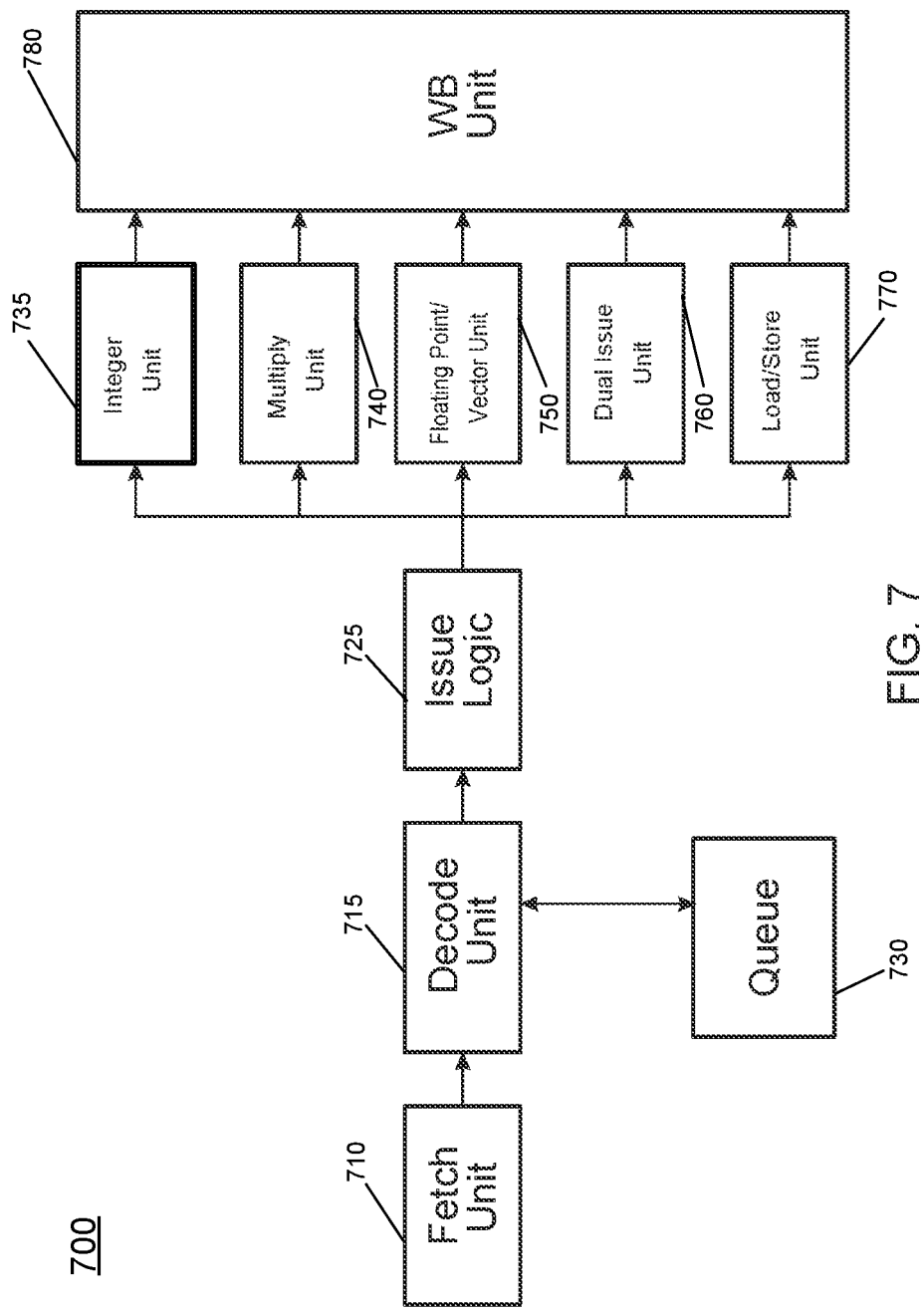
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
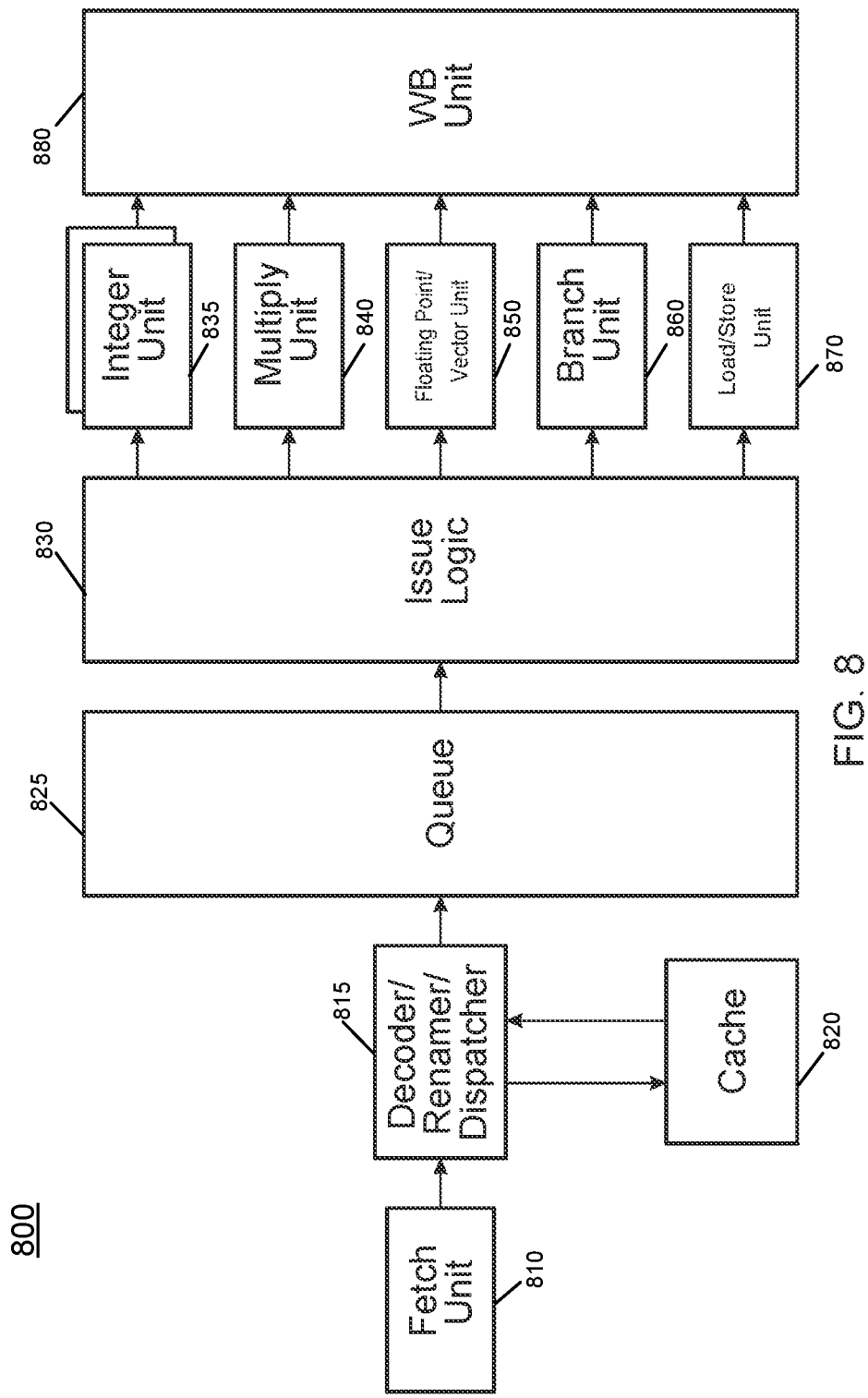
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, coupled to a cache 820. Decoder/renamer/dispatcher 815 may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
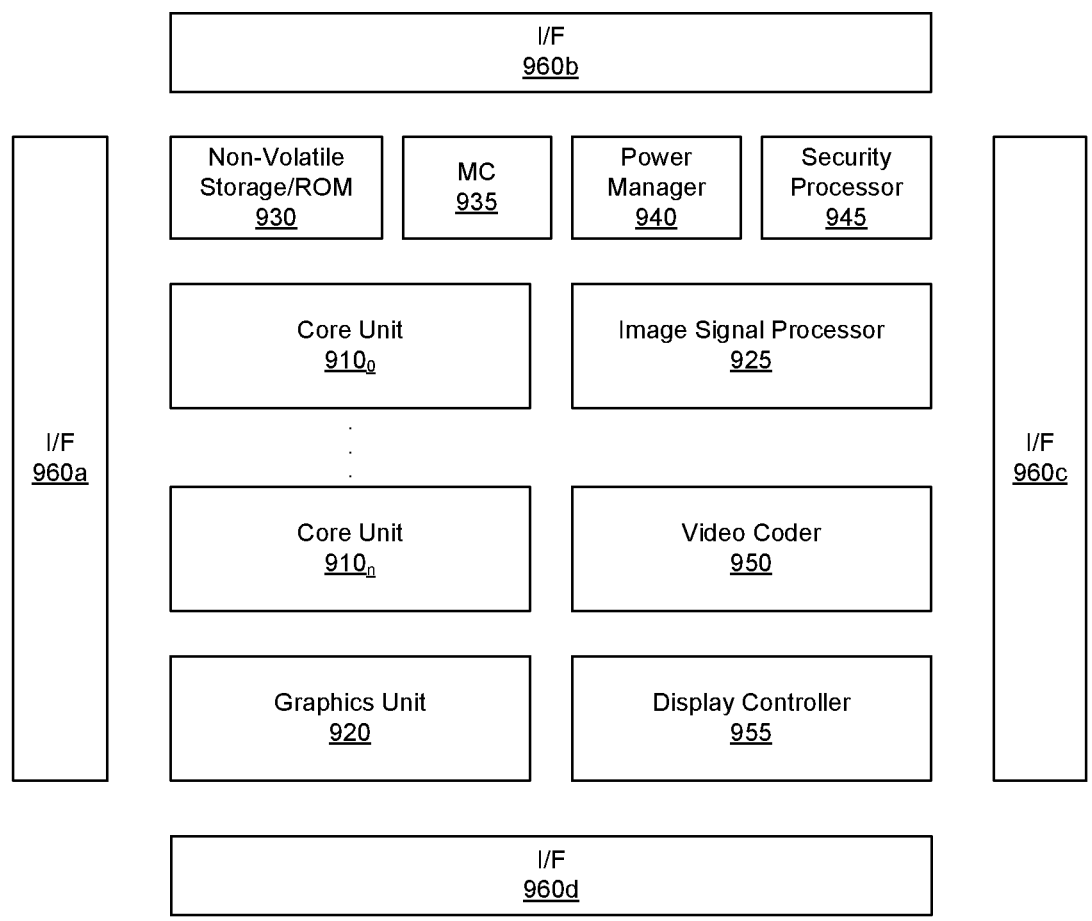
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. As also described herein, each core unit 910 may include a mailbox interface to enable interaction with a corresponding core perimeter logic (not specifically shown in FIG. 9), to enable enhanced communications and provide for efficient entry into and exit from low power states, among other functions. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces $960a$-$960d$ enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
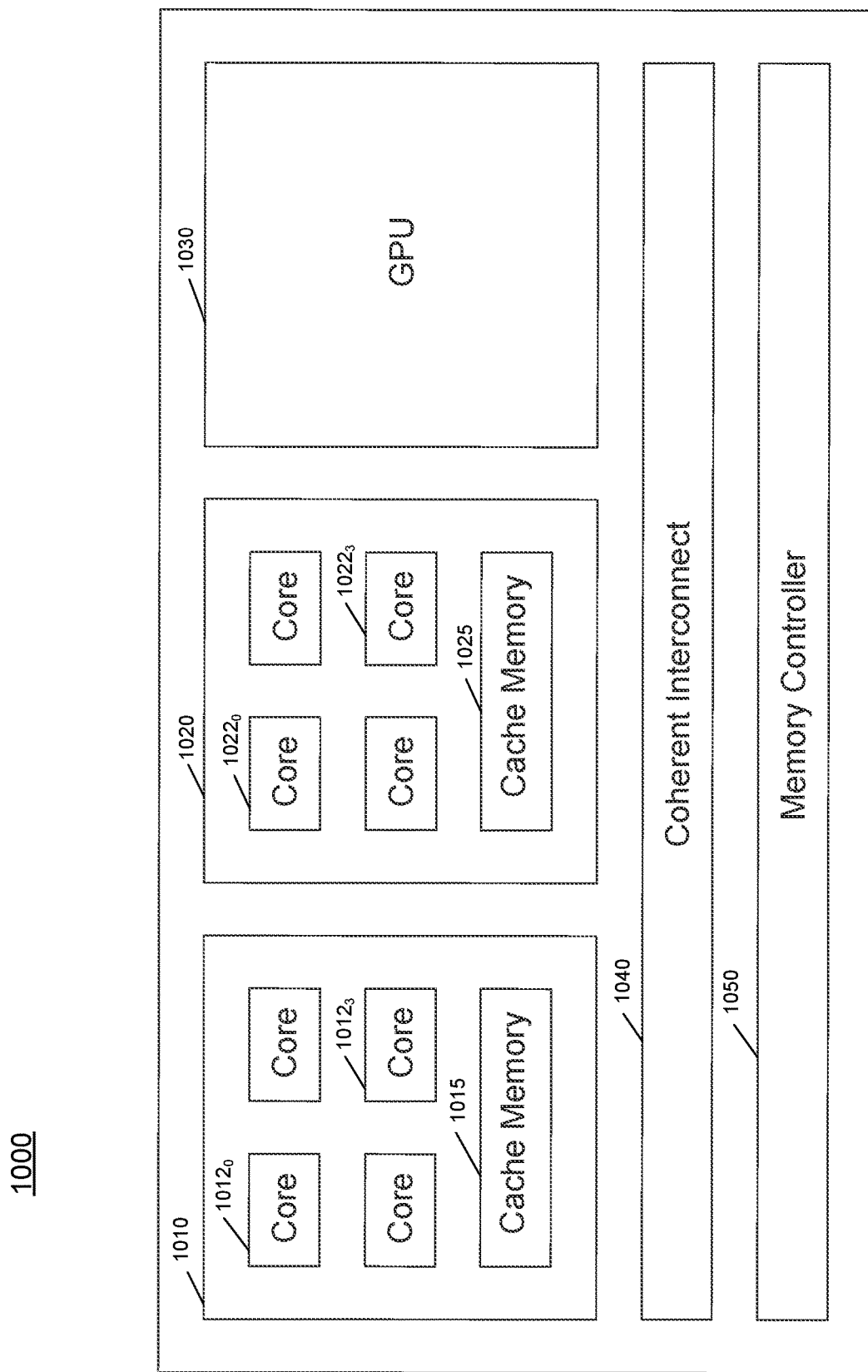
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores that may interface with corresponding core perimeter logic via a mailbox interface as described herein. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
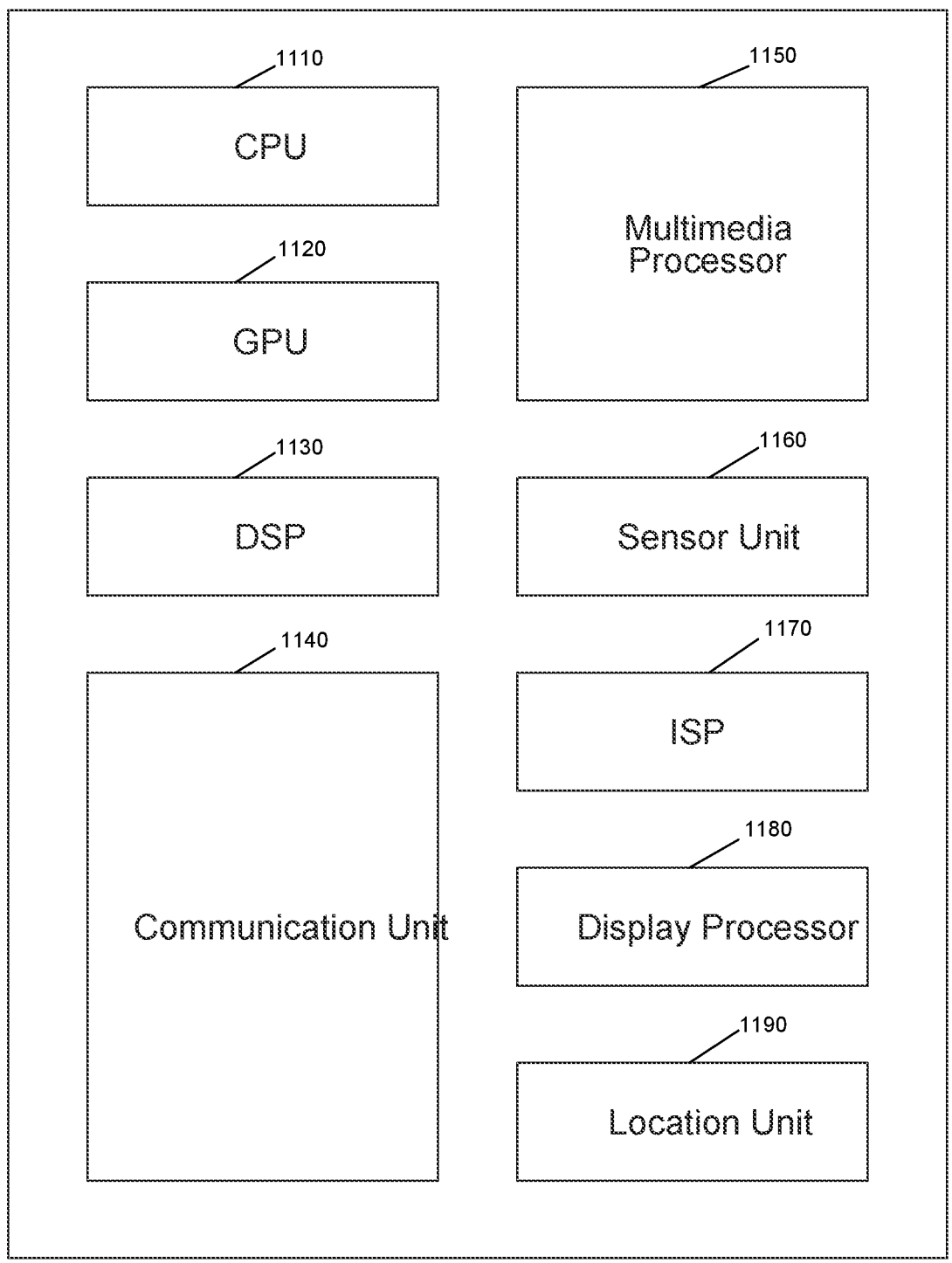
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™ IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
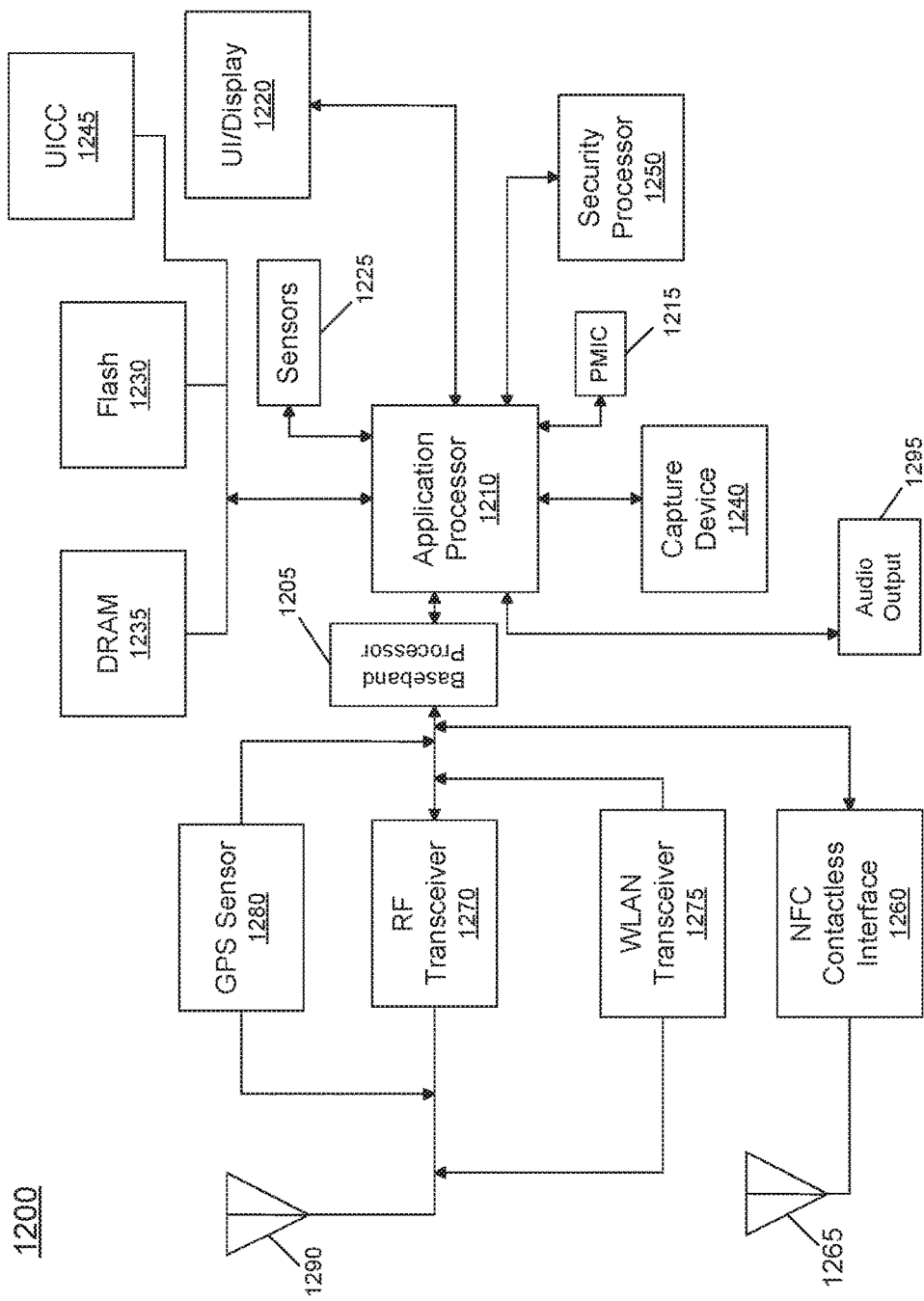
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1245 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
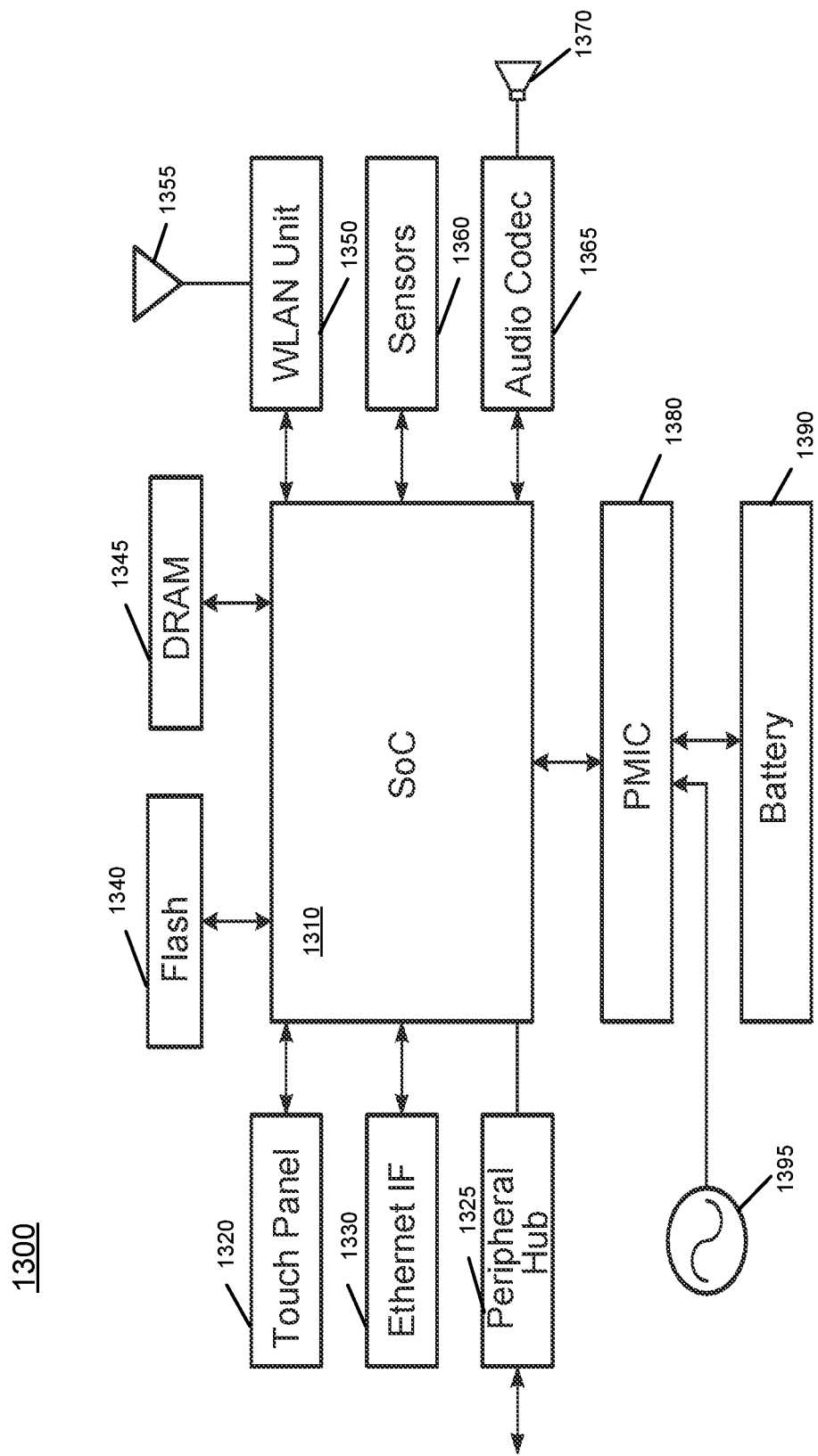
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
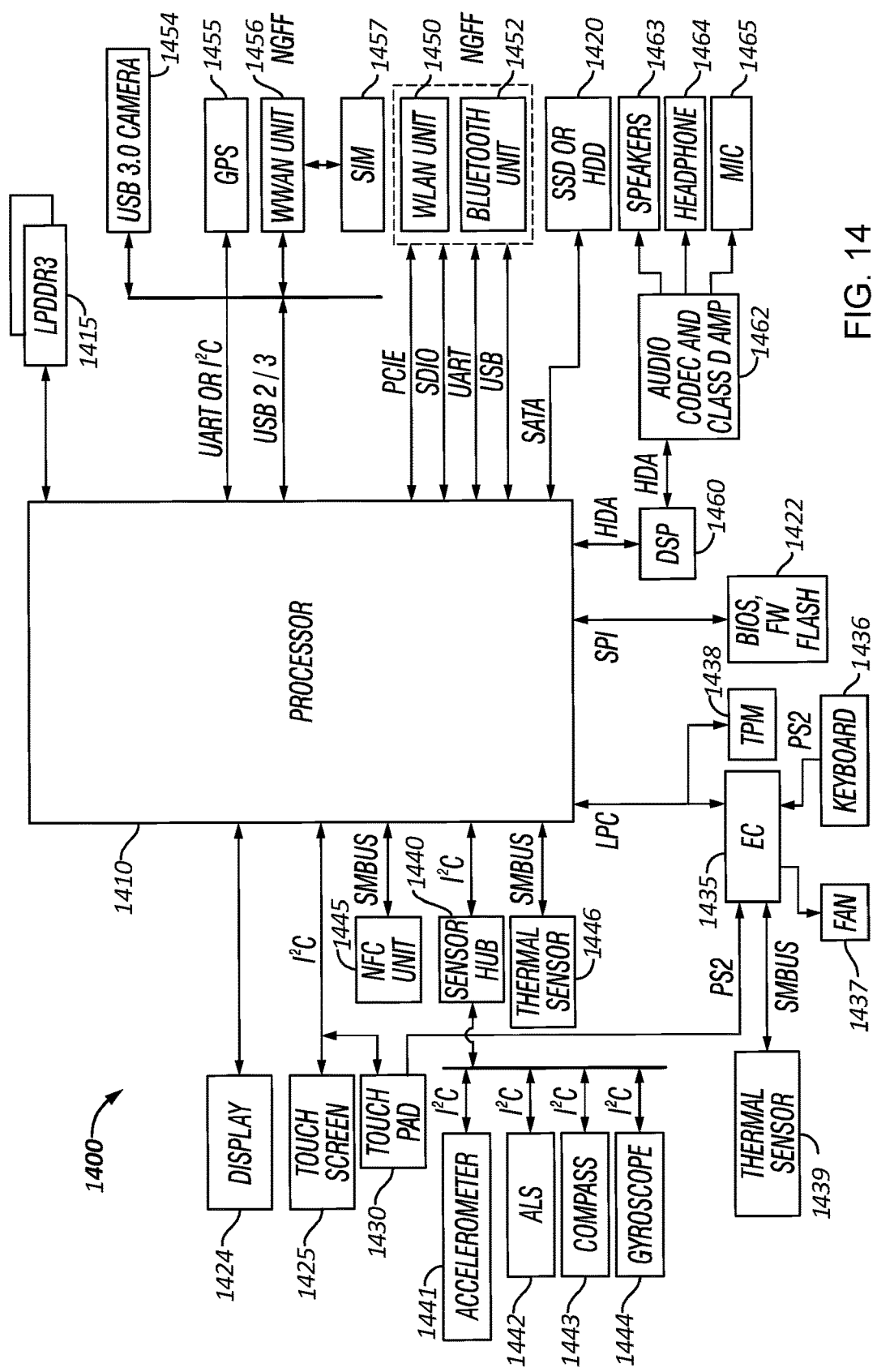
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1410 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I$^2$C interconnect. As further shown in FIG. 14, in addition to touch screen 1425, user input by way of touch can also occur via a touch pad 1430 which may be configured within the chassis and may also be coupled to the same I$^2$C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I$^2$C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
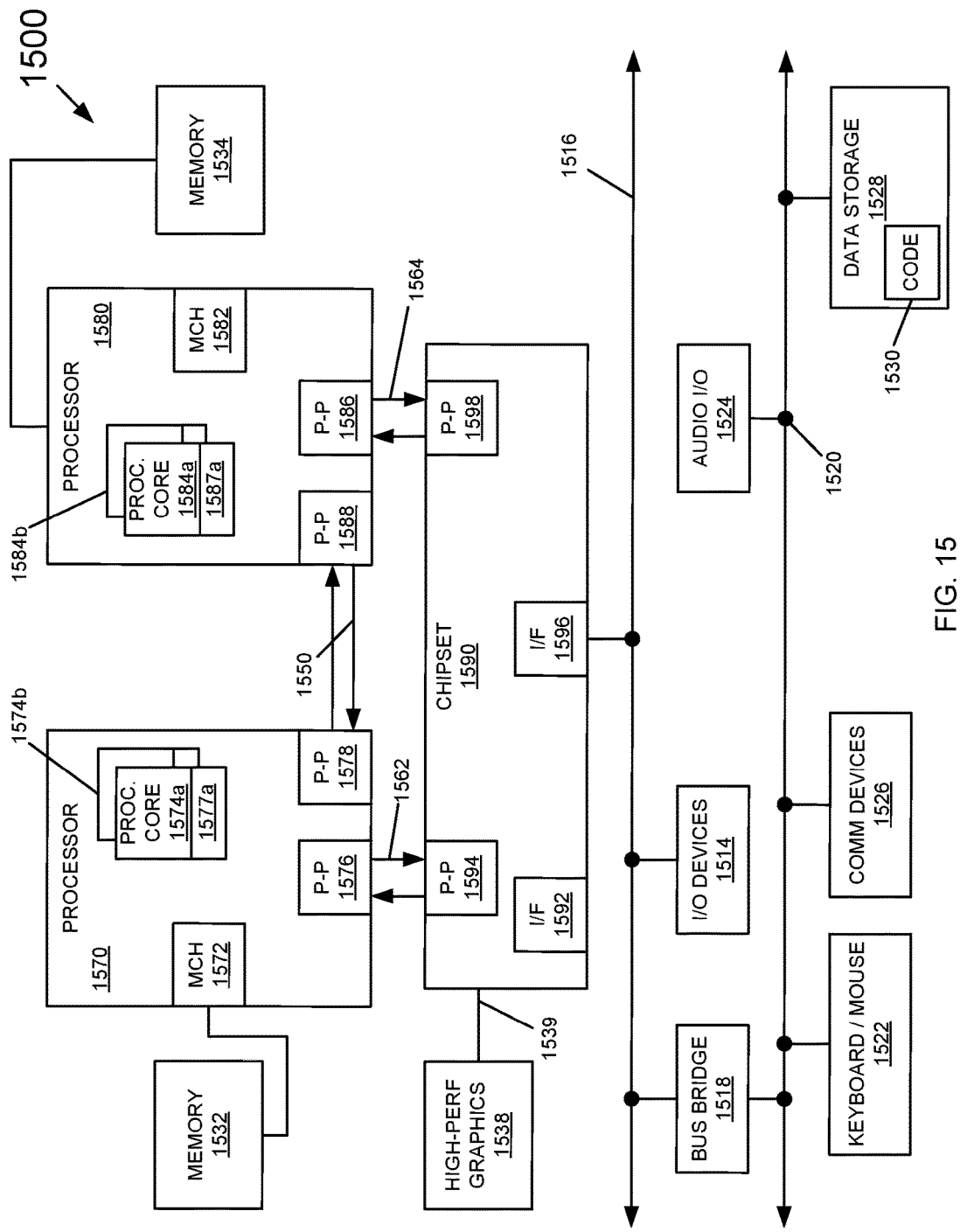
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Such processor cores may couple to corresponding core perimeter logics 1577a and 1577b and core perimeter logics 1587a and 1587b to enable efficient communication of context and other information, both for purposes of low power state entry and exit as well as for communication of information during normal operation. In addition, core perimeter logics 1577a, 1577b and 1587a, 1587b may receive interrupt information while the associated core is in a low power state and provide a matching indication, to enable interrupt handling with reduced latency. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

As will be described herein, in various embodiments when a processor is in a package deep low power state and an interrupt is received, a targeted core can be caused to be woken in parallel with the wake activities of a fabric domain (such as a voltage ramp up time for the fabric domain). In addition to wakeup activities within the targeted core and fabric domain, voltage regulators to supply voltages to such components may also be controlled in parallel to increase their voltage capabilities. As such, all core exit dependencies are eliminated with respect to a fabric domain.

To realize such operation, embodiments enable an identifier of a core targeted by an interrupt to be provided to a power controller of the processor in an early manner, to allow the power controller to determine the appropriate core to be caused to exit from the low power state in parallel with the fabric domain wake up. This determination by the power controller may be based at least in part on a broadcast message sent to power management agents associated with all cores via a separate interconnect mechanism than the fabric domain.

Figure 16:
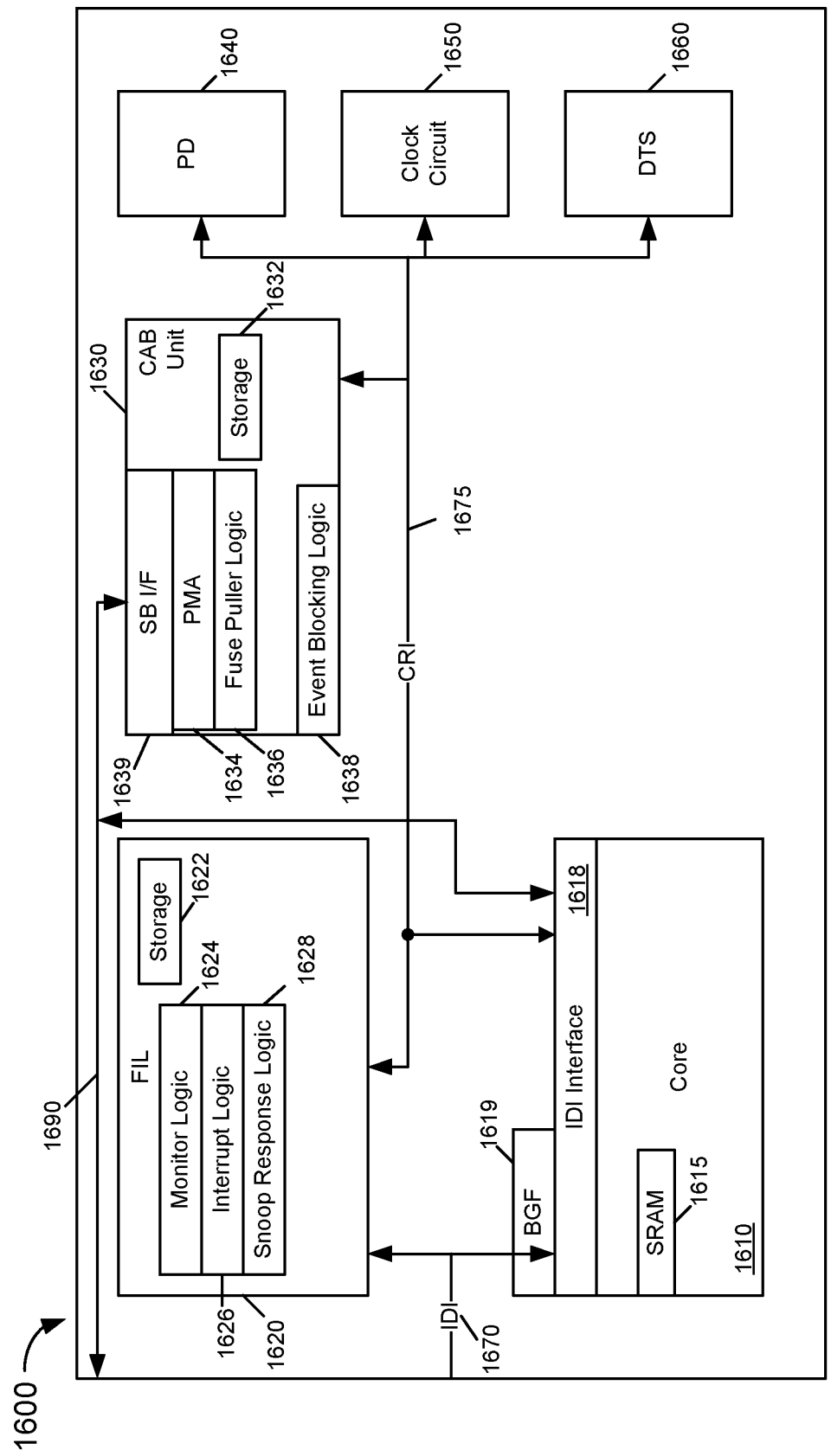
FIG. 16 is a block diagram of a processor in accordance with an embodiment of the present invention.

Referring now to FIG. 16, shown is a block diagram of a processor in accordance with an embodiment of the present invention. As shown in FIG. 16, processor 1600 includes a core 1610 and various core perimeter logic. Understand that for ease of illustration only a single core 1610 is shown. However, in many embodiments a multicore processor includes a plurality of cores, each with its own core perimeter logic. In the high level shown in FIG. 16, the components of processor 1600 all may be implemented on a single semiconductor die. As seen, core 1610 includes a storage 1615, which in an embodiment may be a static random access memory (SRAM) in which various context or state information of the core is stored. Note that the terms "state information" and "context information" are used interchangeably herein, and refer to information such as control register values, data information, register-stored information, and other information associated with a thread being executed on a core or other logic. Such information can be saved when the corresponding thread is switched from the core, e.g., due to entry into a low power state or migration to another core.

In an embodiment, storage 1615 may be configured to remain powered on while the core is in certain low power states. As an example, storage 1615 may maintain information while a core is in a given low power state (e.g., C6) and the processor package is in a package active state (C0). However, in other low power states, such power may not be available, and the context information may be sent to other storages as described herein. Core 1610 further includes an intra-die interconnect (IDI) interface 1618 to interface with an IDI 1670. Although not shown for ease of illustration, understand that IDI 1670 may couple core 1610 with various other circuitry within the processor (not shown for ease of illustration in FIG. 16), including one or more other cores, a peripheral controller hub (PCH), one or more cache memories and/or other uncore circuitry. To provide for an interface between core 1610 and other components within the processor that may operate at different frequencies, a clock crossing logic 1619 may be provided, which in an embodiment may be implemented as a bubble generator first in first out (FIFO) buffer.

To enable core 1610 to enter into particular and deeper low power states when available, a first core perimeter logic, namely a fabric interface logic (FIL) 1620, is coupled to core 1610. FIL 1620 may be of a first sustain power domain, in that it is provided with power and clock signals when at least portions of the processor are in a low power state. As seen, FIL 1620 couples to core 1610 via both IDI 1670 and a second interconnect 1675, which in an embodiment is a control register interconnect (CRi). Interconnect 1675 may be a relatively simple and low performance interconnect to provide for communication of state information during save and restore operations for low power state entry and exit.

In the embodiment shown in FIG. 16, FIL 1620 includes a storage 1622, which may be implemented as a plurality of registers configured to store the state information received from core 1610 prior to the core's entry into a given low power state. Power may be maintained to FIL 1620 until the processor package enters a deeper package low power state (e.g., a package C6 state) when a coherent fabric enters a low power state. As further shown, FIL 1620 includes a monitor logic 1624, an interrupt control logic 1626, and a snoop response logic 1628. In general, monitor logic 1624 may be configured, when core 1610 is in a low power state, to monitor one or more monitored locations for an update to a value stored therein. Upon such update, FIL 1620 may communicate a wakeup request to core 1610. In an embodiment, monitor logic 1624 may thus be configured to implement MONITOR/MWAIT operations while core 1610 is in a low power state. In turn, interrupt control logic 1626 may be configured to handle incoming interrupts while core 1610 is in a low power state. Such handling may include delaying the interrupt and/or sending a response to the interrupt. Still further, in some cases the handling may include causing core 1610 to wake up to handle the interrupt. Note that with the concurrent core and fabric wakeup described herein, in many situations core 1610 may be fully awake by the time an interrupt is received in FIL 1620. Also, FIL 1620 includes a snoop response logic 1628, which may be configured to send a snoop response to a snoop request that is incoming while core 1610 is in a low power state. That is, because there is no corresponding cache line present for a snoop request when the core is in a low power state, snoop response logic 1628 thus may send a response to indicate that core 1610 does not include a copy of a cache line associated with the snoop request.

Still referring to FIG. 16, an additional core perimeter logic is a chassis adapter block (CAB) unit 1630. In general, CAB unit 1630 may be configured to provide an interface to other processor and system components via a sideband interconnect 1690, which may be a power management sideband interconnect. Still further, CAB unit 1630 may be configured to store state information of core 1610 when FIL 1620 itself is placed into a low power state. CAB unit 1630 may be of a second sustain power domain, in that it is provided with power and clock signals when other portions of processor 1600 (including FIL 1620) are in a low power state. CAB unit 1630 includes a storage 1632 that may be configured to store the state information obtained from FIL 1620. This state information may include a current or active advanced programmable interrupt controller (APIC) identifier (ID) for core 1610, to enable CAB unit 1630, and more specifically a power management agent (PMA) 1634 to respond to broadcast wake/APIC ID messages. In an embodiment, storage 1632 of CAB unit 1630 may be a fast storage array, e.g., implemented as a SRAM.

In the embodiment shown, CAB unit 1630 includes a PMA 1634, a fuse puller logic 1636 that may include one or more finite state machines (FSMs) to perform save and restore operations, both with regard to storage 1632 and more distant portions of a memory hierarchy (e.g., a system memory) when CAB unit 1630 itself is to be placed into a low power state. For example, the information stored in storage 1632 may be flushed to system memory when the processor package enters a still deeper package low power state (e.g., a package C10 state). In an embodiment, these FSMs may be system on chip (SoC)-based FSMs as they enable interaction between core perimeter logic and other portions of an SoC (and onto further portions of a memory hierarchy). Note that PMA 1634 may be a portion of power management logic of a processor that may be active when CAB unit 1630 is powered on. In some cases, PMA 1634 may interface with a main power controller of a processor such as a PCU or other power management entity. CAB unit 1630 further includes an event blocking logic 1638, which may be configured to block incoming events when the processor is in particular low power states. Still further, CAB unit 1630 also includes a sideband interface 1639, which may interface with sideband interconnect 1690.

In an embodiment, storage 1632 of CAB unit 1630 may be allowed to be accessed by PMA 1634 or by a verified access received via sideband interface 1639. In one such embodiment, this interface may include a security attribute identifier (SAI) logic to determine whether an access request to storage 1632 has a valid SAI security protection (e.g., a SAI value received with the request matches a SAI value associated with the storage location to be accessed). As such, storage 1632 may be secured to store sensitive content.

In an embodiment, appropriate clocking logic may be applied to the various core perimeter logics to enable the storages and logic therein to be accessed in particular low power states. In an embodiment, double clocking logic may be applied to the storages of the sustain power domains. As one example, a cache coherent fabric (CCF) clock may be provided to the storages for standard read/write operations. In turn, a CRi clock may be provided to the storages for save/restore operations.

Understand that a processor may include additional components and circuitry. In the illustration of FIG. 16, processor 1600 further includes a power delivery unit 1640, which in an embodiment may include one or more fully integrated voltage regulators, a clock circuit 1650, which in an embodiment may be implemented as a phase lock loop, and a digital thermal sensor 1660. As seen, each of these components may communicate with the other components of processor 1600 via interconnect 1675. Understand while shown with this particular processor implementation in FIG. 16, many variations and alternatives are possible.

Figure 17:
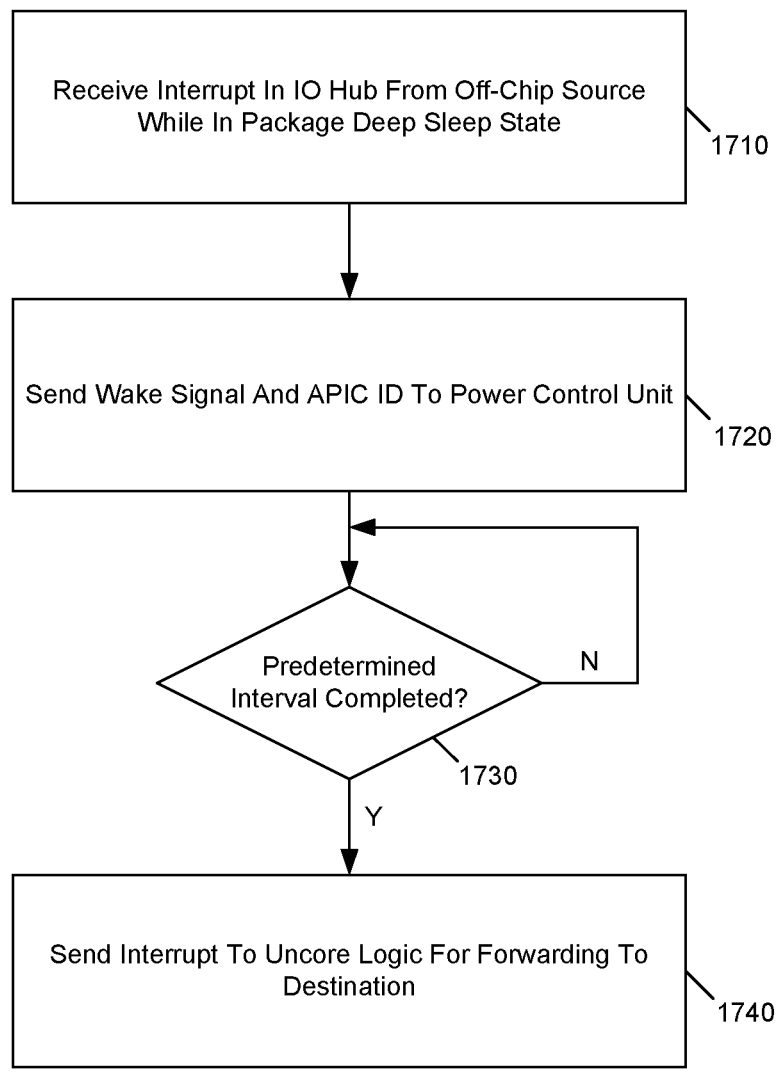
FIG. 17 is a flow diagram of a method in accordance with an embodiment of the present invention.

Referring now to FIG. 17, shown is a flow diagram of a method in accordance with an embodiment of the present invention. As shown in FIG. 17, method 1700 may be performed by hardware, software, firmware, and/or combinations thereof, such as an input/output hub (IOH) or other external-viewing hub or agent that is configured to receive incoming communications from off-chip sources, and send outgoing traffic to various system components. To this end, method 1700 of FIG. 17 may be performed by interface circuitry within such IOH. In various embodiments, such interface circuitry may be implemented as hardware, software, firmware and/or combinations thereof.

As illustrated, method 1700 begins by receiving an interrupt in the IOH (block 1710). More specifically, this interrupt may be received from a given off-chip source, while the processor is in a package deep sleep state. Although the scope of the present invention is not limited in this regard, such package deep sleep state may be an ACPI package C6 state or an even deeper package C-state, such as a package C8 state.

Next, control passes to block 1720 where a wake signal and an advanced programmable interrupt controller (APIC) ID are sent from the IOH to a power control unit of the processor. More specifically the APIC ID is an identifier of the core to which the interrupt is directed, in instances where the received interrupt includes such information as to a requested destination for handling the interrupt. In other cases, it is possible that an incoming interrupt, while destined for the processor, does not include an indication of a specific core or other agent to handle the interrupt.

Still with reference to FIG. 17, next at diamond 1730 it can be determined whether a predetermined interval of time has completed since sending this wake signal. In an embodiment, this predetermined time interval may be set, e.g., within a control register of the IOH. The value of this predetermined time interval may correspond to a minimum guaranteed latency from communication of the wake signal until the IOH is to send the interrupt to further circuitry of the processor. In an embodiment, this predetermined time interval may be on the order of between approximately 20 microseconds to a number of minutes. Finally, method 1700 concludes by sending the interrupt to an uncore logic of the processor to be forwarded to its selected destination. This communication of the interrupt may include various information regarding the interrupt, including identification of source and destination, among other information to be used for handling the interrupt. Understand while shown at this high level in the embodiment of FIG. 17, many variations and alternatives are possible. For example, although a specific interrupt destination core identifier, namely an APIC ID is described, in other cases another type of identifier such as another interrupt destination identifier can be used for broadcast and match operations as described herein. For example, note that a received interrupt can be of many different types. As one example, an incoming interrupt may be a Message Signaled Interrupt (MSI) that is directed to a particular core by way of a destination core identifier. This destination core identifier may, in an embodiment, correspond to an APIC ID, and can be extracted from a destination ID field of the MSI itself.

Figure 18:
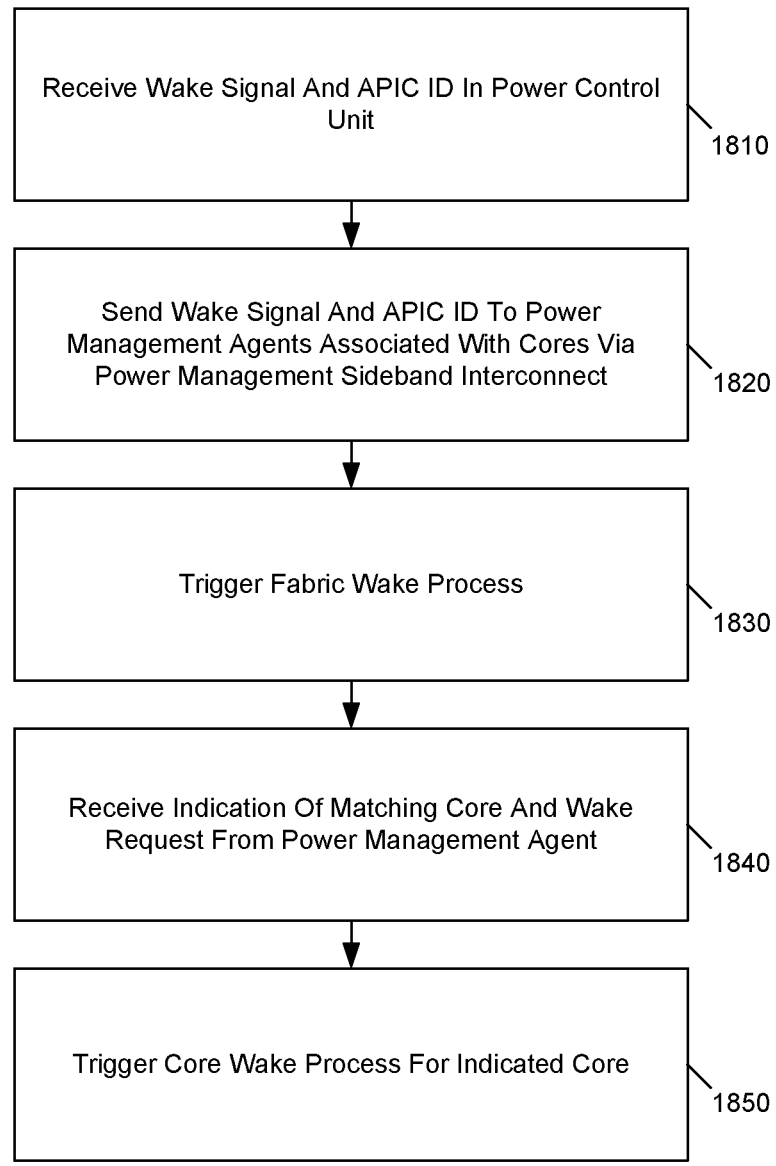
FIG. 18 is a flow diagram of a method in accordance with another embodiment of the present invention.

Referring now to FIG. 18, shown is a flow diagram of a method in accordance with another embodiment of the present invention. More specifically, method 1800 shown in FIG. 18 may be implemented by hardware, software, firmware and/or combinations thereof, such as hardware logic of a PCU. As illustrated, method 1800 begins by receiving a wake signal and APIC ID in the PCU (block 1810). Understand that this combination of wake signal and APIC ID may be received from an IOH or other external interface of a processor (such as described above with regard to method 1700 of FIG. 17).

Still with reference to FIG. 18, next the PCU may send a wake signal and the received APIC ID to power management agents (PMAs) associated with the various cores of the processor (block 1820). In an embodiment, such communication may be via a power management sideband interconnect. By communication of this wake signal with corresponding APIC ID, the PCU is requesting an indication from the PMA associated with the core matching the APIC ID sent with the wake signal.

Still referring to FIG. 18, next at block 1830 a fabric wake process may be triggered. More specifically, in an embodiment the PCU may initiate a fabric wake process for at least portions of a coherent fabric of the processor. In some instances, this fabric wake process may be triggered by sending a fabric wake signal, e.g., to fabric interface logic (FIL) of individual cores, by a broadcast mechanism. In other embodiments, this fabric wake process can further be issued to portions of the coherent fabric itself to enable such circuitry to be placed into an active state.

Still referring to FIG. 18, at block 1840 the PCU may receive an indication of the matching core and a wake request from the PMA of the matching core. Note that this matching core indication is thus a response to the wake signal with APIC ID sent in block 1820. As such, at this point the PCU has determined the appropriate core to place into an active state to handle the interrupt. Responsive to this wake request, control passes to block 1850 where a core wake process can be triggered for the indicated core. Understand that while FIG. 18 shows a sequential flow, in some cases operations may occur in a different sequence. For example, in some cases it is possible that the fabric wake process may be triggered before the broadcast of the wake signal and corresponding APIC ID (effectively reversing sequence of blocks 1820 and 1830). Of course other examples also are possible.

Figure 19:
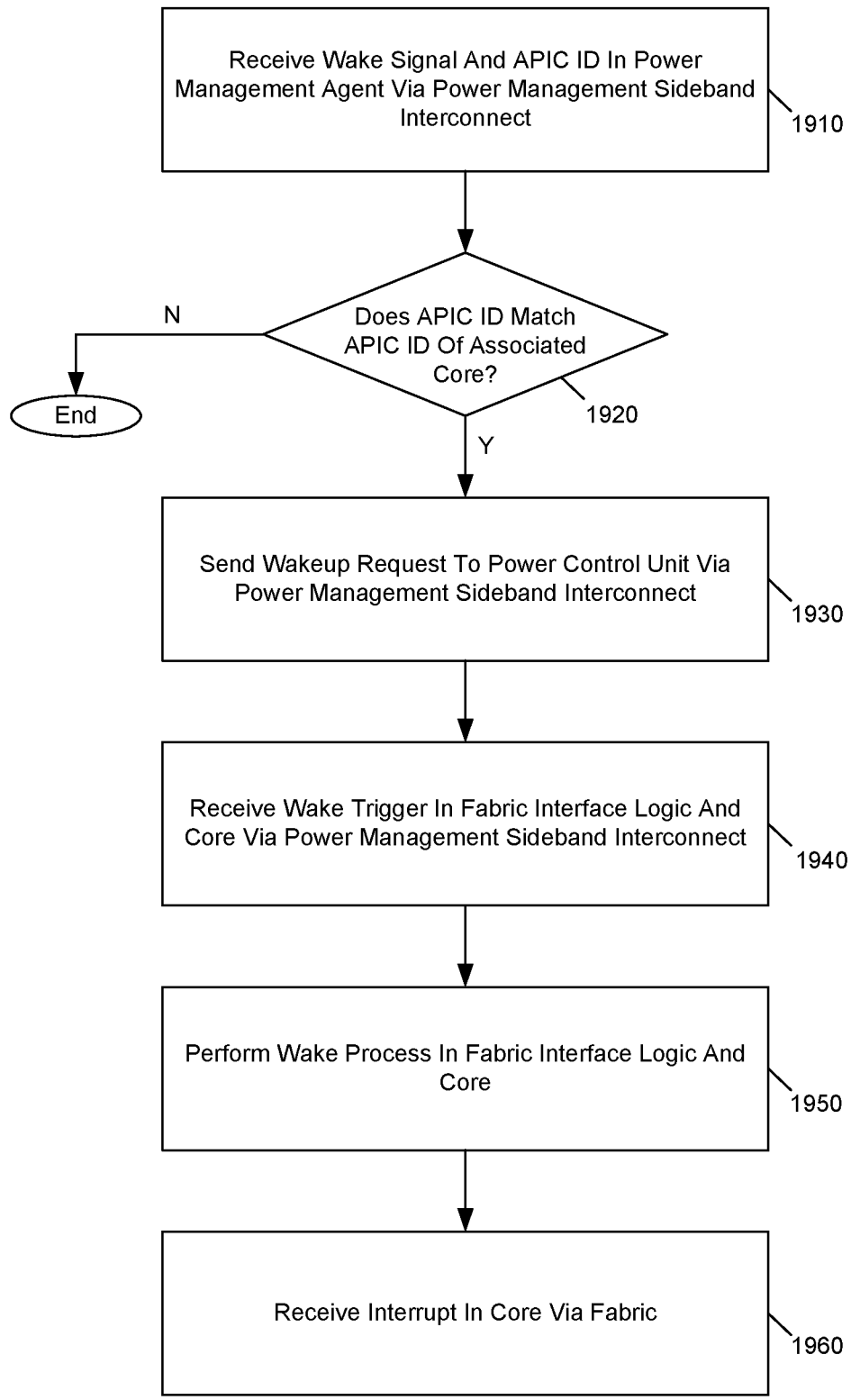
FIG. 19 is a flow diagram of a method in accordance with yet another embodiment of the present invention.

Referring now to FIG. 19, shown is a flow diagram of a method in accordance with yet another embodiment of the present invention. As shown in FIG. 19, method 1900 may be performed by core internal circuitry, along with closely associated circuitry of the core (such as FIL and/or PMA).

As seen, method 1900 begins by receiving a wake signal and APIC ID in the PMA via a power management sideband interconnect (block 1910). As described above, receipt of this information may be responsive to a global broadcast of this information to all cores of a processor. Next, the PMA can determine whether the APIC ID received with this wake signal matches the APIC ID of the associated core (diamond 1920). In an embodiment, this determination may be based on an APIC ID stored in a storage of the PMA, which is the current valid APIC ID for the core. If no match is determined, no further operation occurs within this core with regard to the current interrupt.

Still referring to FIG. 19, instead if the APIC ID matches, control passes to block 1930. At block 1930 a wakeup request is sent to the PCU. In an embodiment, this wakeup request can be sent via the power management sideband interconnect. Of course other links can be used to send the wakeup request. This wakeup request includes an indication of an identifier for the corresponding core to indicate that this core identifier is for the core having the currently matching APIC ID assigned to it. In some cases this core identifier may be different than the APIC ID, such as a static core identifier.

Still with reference to FIG. 19 at block 1940 a wake trigger is received in the FIL and the core via the power management sideband interconnect. This trigger may be received substantially concurrently in the FIL and core. Responsive to receipt of this trigger, various operations can be performed both in the FIL and the core to enter into an active state (block 1950). When in an active state, at block 1960 the core may receive the interrupt and associated information via the active fabric. Note that by using embodiments of the present invention, greatly reduced latency can be realized from time of receipt of an interrupt in a processor to its delivery to an indicated core when that core (and potentially the processor itself) is in a deep low power state, such as a package deep low power state. Understand while shown at this high level in the embodiment of FIG. 19, many variations and alternatives are possible.

Figure 20:
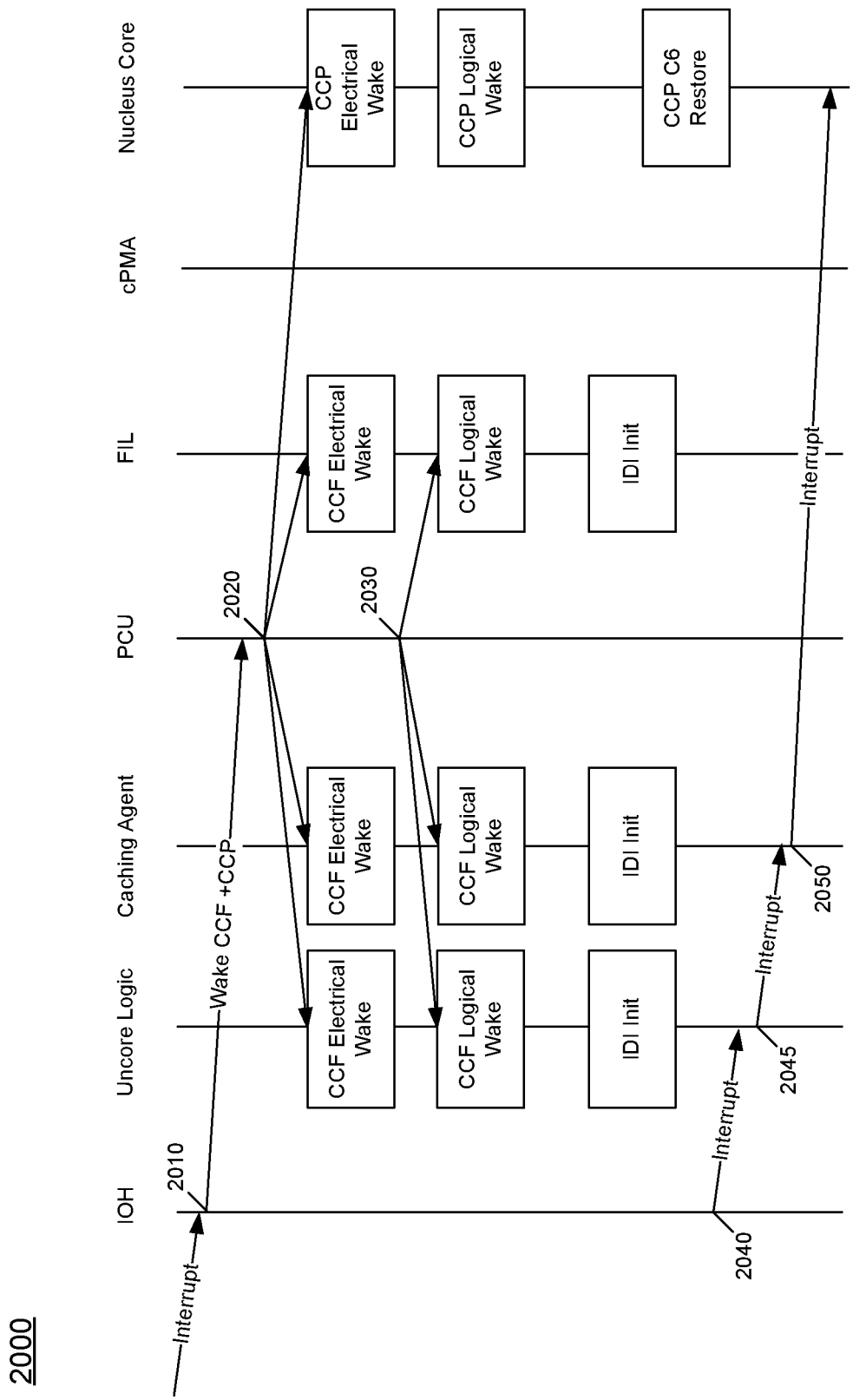
FIG. 20 is a timing diagram illustrating operations within a processor responsive to receipt of an interrupt in accordance with an embodiment of the present invention.
Figure 21:
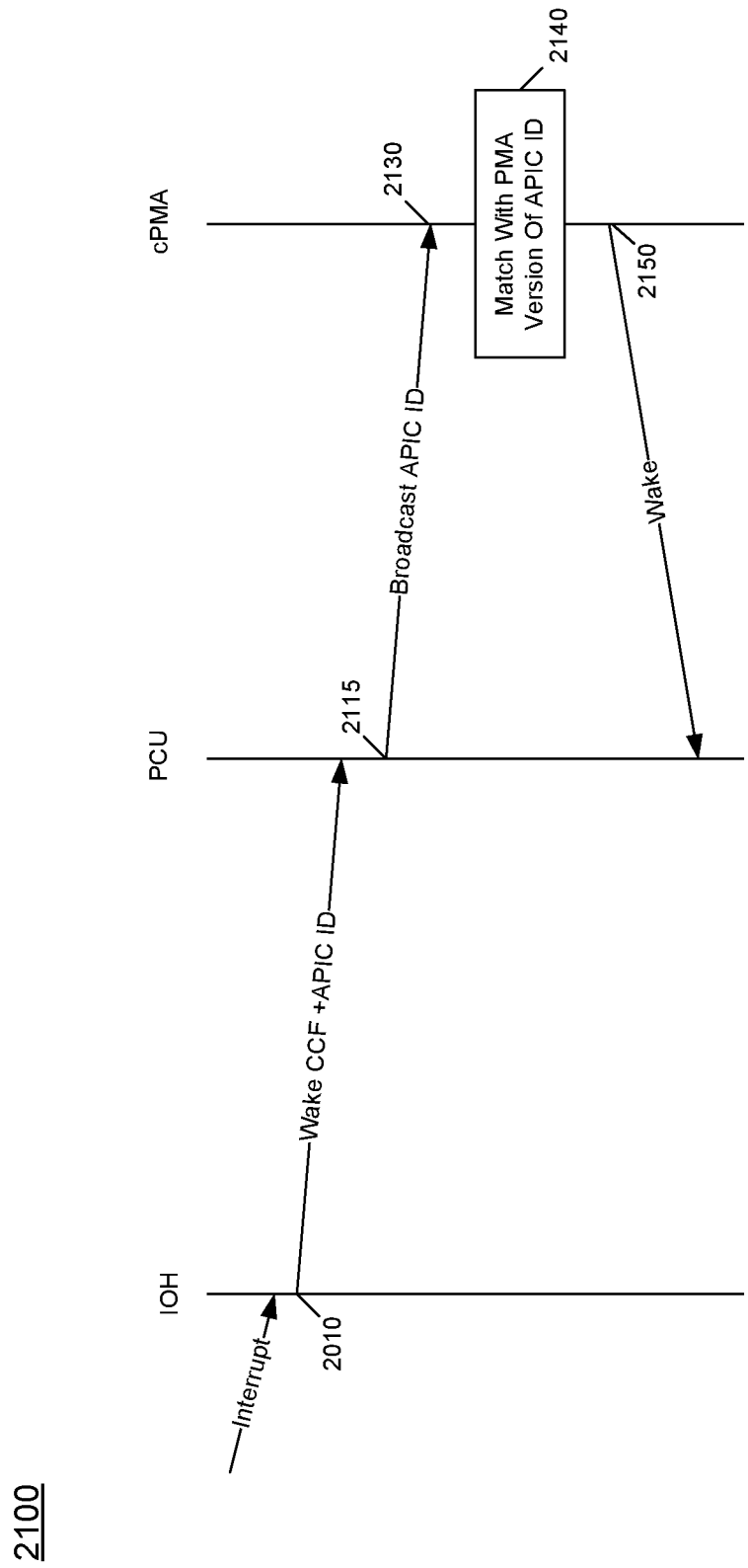
FIG. 21 is a timing diagram of further details of issuance of a wake request in accordance with an embodiment of the present invention.

Referring now to FIG. 20, shown is a timing diagram illustrating operations within a processor responsive to receipt of an interrupt from an external source, while the processor is in a package deep low power state (e.g., a package C8 state). As illustrated in FIG. 20, timing diagram 2000 shows receipt of an interrupt (at time 2010) in an IOH. Responsive to receipt of this interrupt, the IOH sends a wake request (which includes an APIC ID) to be broadcast to PMAs of all the cores, along with a request for waking the various circuitry of the processor, details of which are shown in FIG. 21. More specifically, this wake signal may include a request to wake a cache coherent fabric (CCF) and a CCP request.

Still with reference to FIG. 20, responsive to receipt of this request in the PCU, the PCU will issue a reset request to various core circuitry, including uncore logic, caching agent, and FILs. As illustrated, this reset request may be issued in two separate stages, namely a first reset request sent at time instant 2020 to cause the various components to perform a CCF electrical wake operation. Thereafter, a second portion of the reset request is sent at time instant 2030 to cause a logical wake to occur within the corresponding components, and thereafter initialization of the coherent fabric (inter-die interconnect) occurs.

Understand that responsive to the initial wake request, a corresponding matching core PMA can provide an indication to enable a core wakeup (not shown in FIG. 20). Responsive to receipt of this wake request in the PCU from the matching PMA, the PCU may send a similar reset request, namely a CCP electrical wake request. This request in turn next may trigger a CCP logical wake and thereafter context restore operations to occur, in which context information stored in a given storage (e.g., a C6 storage) can be obtained and restored to the core. As such, core wakeup activities proceed in parallel with fabric wakeup activities. As such, embodiments enable improved interrupt delivery with lower latency. Thus as seen, at time instant 2040, the IOH can deliver the interrupt to uncore logic, which in turn at time instant 2045 forwards the interrupt to a caching agent. Thereafter, the caching agent can directly deliver the interrupt at time instant 2050 to an already woken core.

With reference now to FIG. 21, shown is a timing diagram of further details of the issuance of a wake request that is broadcast with an APIC ID. Thus as illustrated in FIG. 21, timing diagram 2100 may occur in parallel with the operation shown in FIG. 20 (and more specifically approximately within the time frame of the messages sent by the PCU at time instant 2020). First, an interrupt is received in IOH (same as in FIG. 20), which results in issuance of the wake request with corresponding APIC ID to the PCU at time instant 2010.

As shown in this further detail of FIG. 21 responsive to this request, the PCU may issue a broadcast APIC ID to all core PMAs at time instant 2115 (as received by a representative core PMA at time instant 2130). Understand that this broadcast can be sent substantially around the same time as the first reset request sent in FIG. 20 and with the corresponding wake signal. Thereafter, the core PMA may access an internal storage to determine whether it stores a matching APIC ID (as determined at block 2140). Understand that this PMA-internal storage stores a current APIC ID for the associated core (which may dynamically change during normal system operation). Assume a match is determined for the identified core in FIG. 21. In this case, the core PMA sends a wake request at time instant 2150 to the PCU with an identifier of the core. Understand that responsive to this return of the matching core with a request to wake from the low power state, the PCU can cause the identified core to exit the low power state by sending a wake signal to instruct the core to perform a wake flow to exit the low power state. While shown at this high level in FIG. 21, various additional operations can be performed in other embodiments.

The following examples pertain to further embodiments.

In one example, a processor comprises: a plurality of cores, at least some of the plurality of cores having an APIC identifier associated therewith; a plurality of power management agents associated with the plurality of cores; and a power controller to receive an indication of an interrupt and a first APIC identifier and send a wake signal and the first APIC identifier to the plurality of power management agents to determine which of the plurality of cores is associated with the first APIC identifier.

In an example, the power controller is to send the wake signal and the first APIC identifier when the processor is in a package low power state.

In an example, responsive to the determination, the power controller is to cause a fabric coupled to the plurality of cores and the determined core associated with the first APIC identifier to wake up, while others of the plurality of cores are to remain in a low power state.

In an example, a power management agent associated with the determined core is to send a wake request to the power controller, responsive to a match between the first APIC identifier and an APIC identifier of the determined core stored in a storage associated with the power management agent.

In an example, the power management agent is to send the wake request via a power management sideband interconnect, while the fabric coupled to the plurality of cores is not in an active state.

In an example, the power management agent is to send a core identifier with the wake request, the core identifier to identify the destined core and different than the APIC identifier associated with the destined core.

In an example, the power controller is to cause the determined core and the fabric to exit a low power state concurrently.

In an example, the processor of one or more of the above examples further comprises a caching agent, where the caching agent is to send the interrupt directly to the core via the fabric, after the core and the fabric have entered an active state.

In an example, the processor of one or more of the above examples further comprises a plurality of adapter units associated with the plurality of cores, where the plurality of adapter units comprises the plurality of power management agents.

In an example, the plurality of adapter units are to be maintained in an active state when the associated plurality of cores are in a first low power state.

Note that the above processor can be implemented using various means.

In an example, the processor comprises a SoC incorporated in a user equipment touch-enabled device.

In another example, a system comprises a display and a memory, and includes the processor of one or more of the above examples In another example, a method comprises: receiving a wake signal and an interrupt destination identifier in a power control unit of a processor while the processor is in a low power state, responsive to receipt of an interrupt in the processor; sending the wake signal and the interrupt destination identifier to a plurality of power management agents of the processor via a power management sideband interconnect; receiving an indication of a core associated with the interrupt destination identifier; and concurrently causing the core associated with the interrupt destination identifier and a fabric that couples the plurality of cores to exit the low power state concurrently.

In an example, the method further comprises broadcasting the wake signal and the interrupt destination identifier to the plurality of power management agents.

In an example, the method further comprises receiving the wake signal in the power control unit from an interface circuit of the processor.

In an example, the method further comprises receiving the interrupt in the core associated with the interrupt destination identifier from a uncore logic coupled to the interface circuit.

In an example, the method further comprises maintaining others of the plurality of cores in the low power state while causing the core and the fabric to exit the low power state.

In an example, receiving the indication of the core associated with the interrupt destination identifier comprises receiving a message from a power management agent associated with the core, the message to indicate that the core is associated with the interrupt destination identifier and to request the power control unit to wake the core from the low power state.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system comprises: a processor having a power controller, a core to execute instructions and a core perimeter logic coupled to the core, the core perimeter logic including a power management agent to access an interrupt destination identifier associated with the core, where the power management agent is to send a message to the power controller to request the power controller to cause the core to wake up, responsive to detection of a match between a first interrupt destination identifier of a broadcast message sent to a plurality of cores and the interrupt destination identifier associated with the core; and a DRAM coupled to the processor.

In an example, the processor further comprises a fabric to couple the plurality of cores and a sideband interconnect to couple the power controller to a plurality of core perimeter logics, where the power controller is to send the broadcast message via the sideband interconnect responsive to receipt of an interrupt in the processor while the processor is in a low power state.

In an example, the power controller is to cause the core and the fabric to exit the low power state concurrently.

In an example, the power controller is to receive a wake signal and the interrupt destination identifier from an interface circuit of the processor, responsive to receipt of the interrupt in the processor while the processor is in a package low power state.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores, at least some of the plurality of cores having an advanced programmable interrupt controller (APIC) identifier associated therewith;
a plurality of adapter units associated with the plurality of cores, wherein the plurality of adapter units comprises a plurality of power management agents each associated with one of the plurality of cores; and
a power controller to receive an indication of an interrupt and a first APIC identifier and send a wake signal and the first APIC identifier to the plurality of power management agents to determine which of the plurality of cores is associated with the first APIC identifier, wherein responsive to the determination, the power controller is to cause a fabric coupled to the plurality of cores and the determined core associated with the first APIC identifier to wake up, while others of the plurality of cores are to remain in a low power state, wherein a power management agent associated with the determined core is to send a wake request to the power controller via a power management sideband interconnect, while the fabric coupled to the plurality of cores is not in an active state responsive to a match between the first APIC identifier and an APIC identifier of the determined core stored in a storage associated with the power management agent.

2. The processor of claim 1, wherein the power controller is to send the wake signal and the first APIC identifier when the processor is in a package low power state.

3. The processor of claim 1, wherein the power management agent is to send a core identifier with the wake request, the core identifier to identify the determined core and different than the APIC identifier associated with the determined core.

4. The processor of claim 1, wherein the power controller is to cause the determined core and the fabric to exit the low power state concurrently.

5. The processor of claim 2, further comprising a caching agent, wherein the caching agent is to send the interrupt directly to the determined core via the fabric, after the determined core and the fabric have entered an active state.

6. The processor of claim 1, wherein the plurality of adapter units are to be maintained in an active state when the associated plurality of cores are in a first low power state.

7. A non-transitory machine-readable medium having stored thereon instructions, which if performed by a machine cause the machine to perform a method comprising:
receiving a wake signal and an interrupt destination identifier in a power control unit of a processor while the processor is in a low power state, responsive to receipt of an interrupt in the processor;
sending the wake signal and the interrupt destination identifier to a plurality of power management agents of the processor via a power management sideband interconnect;
receiving an indication of a core of the processor associated with the interrupt destination identifier, comprising receiving a message from a power management agent associated with the core, the message to indicate that the core is associated with the interrupt destination identifier and to request the power control unit to wake the core from the low power state; and
concurrently causing the core associated with the interrupt destination identifier and a fabric that couples a plurality of cores of the processor to exit the low power state concurrently.

8. The non-transitory machine-readable medium of claim 7, wherein the method further comprises broadcasting the wake signal and the interrupt destination identifier to the plurality of power management agents.

9. The non-transitory machine-readable medium of claim 7, wherein the method further comprises receiving the wake signal in the power control unit from an interface circuit of the processor.

10. The non-transitory machine-readable medium of claim 9, wherein the method further comprises receiving the interrupt in the core associated with the interrupt destination identifier from a uncore logic coupled to the interface circuit.

11. The non-transitory machine-readable medium of claim 7, wherein the method further comprises maintaining others of the plurality of cores in the low power state while causing the core and the fabric to exit the low power state.

12. A system comprising:
a processor having a power controller, a plurality of cores to execute instructions, a fabric to couple the plurality of cores and a sideband interconnect to couple the power controller to a plurality of core perimeter logics coupled to the plurality of cores, each of the core perimeter logics including a power management agent to access an interrupt destination identifier associated with a corresponding core, wherein the power management agent is to send a message to the power controller to request the power controller to cause the corresponding core to wake up, responsive to detection of a match between a first interrupt destination identifier of a broadcast message sent to the plurality of cores and the interrupt destination identifier associated with the corresponding core, wherein the power controller is to send the broadcast message via the sideband interconnect responsive to receipt of an interrupt in the processor while the processor is in a low power state; and
a dynamic random access memory (DRAM) coupled to the processor.

13. The system of claim 12, wherein the power controller is to cause the corresponding core and the fabric to exit the low power state concurrently.

14. The system of claim 12, wherein the power controller is to receive a wake signal and the interrupt destination identifier from an interface circuit of the processor, responsive to receipt of the interrupt in the processor while the processor is in a package low power state.

* * * * *